United States Patent Office 2,848,342
Patented Aug. 19, 1958

2,848,342

PROTEIN COMPOSITIONS

James Dudley Atkinson, Jr., Memphis, Tenn., assignor to The Buckeye Cellulose Corporation, Memphis, Tenn., a corporation of Ohio No Drawing. Application March 3, 1955
Serial No. 492,031

4 Claims. (Cl. 106—154)

This invention relates to dry protein-containing mixtures. More particularly this invention relates to dry protein-containing mixtures which are self-dispersible in water.

It is an object of this invention to prepare dry protein-containing mixtures.

It is a further object to prepare dry protein-containing mixtures which are capable of spontaneous dispersion when added to water.

I have found that these objects can be accomplished by providing in admixture, in dry form, a protein, urea and urease.

Other objects and advantages will be apparent from the following description.

The industrial applications of protein are wide and varied. Among the most prominent of these are applications in paper coating compositions, adhesives and paints of various types. In all of these and many other uses the protein must of course be dispersed, normally in water, before it can be utilized. This dispersion is generally accomplished by adding to an aqueous suspension of protein an alkaline material such as, for example, sodium sulfite, sodium hydroxide, borax, soda ash. In preparing such dispersions the pH of the dispersant is oftentimes a controlling factor and, as a consequence, the user must very carefully measure the amount of the particular alkaline materials to be used in preparing the dispersing medium. The separate handling of the component materials in preparing a protein dispersion and the care which is frequently required in preparing such dispersions have long been a source of annoyance and trouble for the user. Consequently, there is a great demand for a protein-containing mixture which requires only the addition of water to prepare it for use.

Attempts have been made heretofore to produce such a self-dispersing protein-containing composition with but little success. For example, mixtures of protein and a solid alkali, such as borax or soda ash, are not satisfactory because of the tendency for the mixture to form lumps when added to water—the lumping presumably being caused by the rapid dispersion of the alkali and subsequent rise in pH before the protein component has been thoroughly wetted by the liquid dispersing medium.

In addition to the alkali dispersion methods mentioned above, it has also been heretofore proposed that urea be used as a dispersing agent for protein (see, for example, U. S. Patent 2,516,700). It has been further suggested (U. S. Patent 1,725,805) that a product in dry powder form can be prepared by mixing urea and casein. This product, upon the addition of water alone, is said to be in a form ready for use in adhesive applications.

However, to the best of my knowledge, whenever urea has heretofore been suggested as a dispersing agent for protein, it has either been used with proteins which have no urease (enzyme) activity, or some effort has been made to avoid or destroy any enzyme activity, as by urease. In such cases it is the urea per se which acts as the dispersant—presumably forming a soluble complex with the protein—and it therefore must be used in relatively large amounts, e. g. normally about as much urea as protein is used.

Contrary to these teachings, I have found that enzyme activity, particularly urease activity, can be advantageously utilized to disperse protein in water. More particularly, I have found that a dry protein-containing composition can be prepared which, in utilizing urease activity, is spontaneously dispersible when added to water.

The dry protein-containing compositions of my invention which are capable of spontaneous dispersion in water comprise a protein, urea and urease. When such a composition is added to water the urease reacts with and hydrolyzes the urea to ammonia and carbon dioxide. Since two mols of ammonia are formed for each mol of carbon dioxide, and since ammonia is a relatively strong base and carbon dioxide is a very weak acid, the liberated ammonia dissolving in the water gradually increases the alkalinity of the water until a point is reached where the solution become sufficiently alkaline to disperse the protein. Dispersion of the protein will normally occur in the pH range from about 8 to 9 and the amount of urea present should therefore be adequate to provide a sufficient amount of ammonia upon reaction with the urease to give a pH within this range. In any event the amount of urea must be adequate to the formation of an amount of ammonia sufficient for substantially complete dispersion of the protein.

In preparing the compositions of my invention I prefer to use a protein which has retained its native urease activity, that is, one in which the enzyme, urease, has not been destroyed during the extraction process. A soybean protein which has been extracted under mild conditions (for example 110° F., at a pH of 9 to 10 for about one hour) and which is for that reason substantially unhydrolyzed and undenatured is admirably suited for my compositions. A protein of this type is contemplated wherever in the following examples a soybean protein is designated. Low-temperature-processed soy flour is another protein-containing material which has retained urease activity and which is also suitable for use in my compositions.

When using an undenatured and unhydrolyzed protein in my compositions, as mentioned above, the rate of solution of the protein may, if desired, be accelerated by the addition to the dry composition of a small amount (from about 4% to about 20%) of a urease-rich flour (e. g. jack bean flour or low temperature soy flour), or by mild heating (90°–100° F.). Alternatively, additional urease may be added to the initial suspension of my self-dispersing compositions in water to accelerate dispersion of the protein.

Proteins devoid of urease activity may also be used in preparing my compositions but in such cases urease must be added to the composition in order that it will be self-dispersible in water. Alternatively, rather than using urease per se as a component of my composition, the desired urease activity may be obtained by using a strong urease carrier such as, for example, cold-extracted soybean flakes or low-temperature processed soy flour. An example of a self-dispersing protein of the type contemplated here would be, in combination, casein, urea and added urease.

I have found that when using a substantially undenatured and unhydrolyzed protein satisfactory dispersion is obtained when the ratio of protein to urea is in the range from about 30 to 1 to about 2½ to 1. These ratios are also advantageously observed when a urease-free protein is to be dispersed—the addition of urease from an independent source being of course necessary for dispersion. In such cases I have found that with a commercially available form of urease, which is purported to be derived from jack bean meal and to have a urease activity of about 375 Sumner units per gram, the addition of from about 0.25% to about 1% of urease by weight of the protein is adequate to the dispersion of the protein. It is to be understood, however, that the urease activity of various urease-bearing materials varies considerably and that consequently the actual amount of urease-bearing material required to obtain a dispersion of urease-free protein will be inversely proportional to the activity relative to the 375 Sumner unit activity noted above.

Expressed on percentage by weight of the protein, I have found that from about 3.3% to about 40% urea gives satisfactory results. Amounts less than about 3.3% are generally productive of incomplete dispersions and are for that reason usually not desirable. Amounts greater than about 40% are not normally economically practical.

Dispersion of protein according to the method herein described may be carried out at any temperature in the range from room temperature (about 70° F.) up to about 140° F. I prefer, however, to carry out the dispersion at temperatures in the range from about 100° F. to about 110° F. In any event, overheating should be avoided since at the higher temperatures (e. g. 180° F.) urease activity is destroyed.

With the dry protein-containing compositions of my invention it is important that the moisture content of the protein, whether it has urease activity or not, be carefully controlled. Moisture contents up to about 10% can be tolerated. Amounts of moisture in excess of this value should be avoided because of the spontaneous urease-urea reaction in the presence of moisture with the consequent decomposition of the dry product to the point where it becomes devoid of available ammonia and loses its self-dispersing characteristic.

It is to be understood that the following examples are not to be construed as limiting my invention but are only illustrative thereof. Other materials may, if desired, be incorporated in the dry mixes to impart particular properties thereto, for example, fillers, such as kaolinite clay, or defoaming, wetting and deflocculating agents, or materials that will react with and modify the protein upon dispersion, such as, inorganic sulfites and organic surface active agents, may be added.

*Example 1.*—25.6 grams of a self-dispersing protein composition containing 70.3% casein (devoid of urease activity), 15.6% soy flour (as a source of urease), and 14.1% urea were added to 100 ml. of water at 77° F. The pH of the slurry rose from an initial value of about 6.0 to about 8.9 in 2½ hours, with substantially complete dispersion of the protein.

*Example 2.*—25 grams of a self-dispersing protein composition containing 72% soybean protein, 12% urea, and 16% soy flour (urease-rich), were added to 100 ml. of water at 77° F. The pH of the slurry rose from an initial 5.8 to about 8.9 in 3 hours, with substantially complete dispersion of the protein.

*Example 3.*—18 grams of a self-dispersing protein composition containing 83.3% soybean protein and 16.7% urea was added to 70 ml. of water at 74° F. The pH of the slurry rose from an initial value of about 5.4 to about 8.8 in about two hours with substantially complete dispersion of the protein.

*Example 4.*—30 grams of soy flour with retained urease activity when mixed with 2 grams of urea will form a dry self-dispersing protein-containing mixture. This mixture when added to 100 ml. of water at room temperature will substantially completely disperse in less than about two hours with a rise in pH of the slurry from about 6.0 to about 8.9.

Having thus described my invention, what I claim and desire to secure by Letters Patent is:

1. As a new composition of matter a protein-containing mixture containing not in excess of 10% water capable of substantially complete spontaneous dispersion in water comprising a protein, urea and urease, the said urea being present in an amount from about 3.3% to about 40% and the said urease being present in an amount equivalent to about 0.25% to about 1.0% of urease having an activity of about 375 Sumner units per gram, both by weight of the protein.

2. A protein-containing mixture containing not in excess of 10% water capable of substantially complete spontaneous dispersion in water consisting of a substantially unhydrolyzed and undenatured soybean protein characterized by a retained urease activity equivalent to about 0.25% to about 1.0% of urease having an activity of about 375 Sumner units per gram, and urea in an amount from about 3.3% to about 40% by weight of the protein.

3. A protein-containing mixture containing not in excess of 10% water capable of complete spontaneous dispersion in water comprising a protein characterized by the absence of urease activity, urea in an amount from about 3.3% to about 40% by weight of the protein and added urease in an amount equivalent to about 0.25% to about 1.0% of a urease having an activity of about 375 Sumner units per gram, based on the weight of the protein.

4. A protein-containing mixture containing not in excess of 10% water capable of substantially complete spontaneous dispersion in water consisting of soybean flour characterized by retained urease activity equivalent to about 0.25% to about 1.0% of a urease having an activity of about 375 Sumner units per gram and urea in an amount from about 3.3% to about 40% by weight of the protein.

References Cited in the file of this patent

UNITED STATES PATENTS

| | | |
|---|---|---|
| 1,725,805 | Landecker | Aug. 27, 1929 |
| 2,232,052 | Cummins | Feb. 18, 1941 |
| 2,262,771 | La Piana | Nov. 18, 1941 |
| 2,450,810 | Opper et al. | Oct. 5, 1948 |
| 2,516,700 | Holloway et al. | July 25, 1950 |
| 2,559,901 | Scheid | July 10, 1951 |
| 2,702,800 | Hipp et al. | Feb. 22, 1955 |